UNITED STATES PATENT OFFICE.

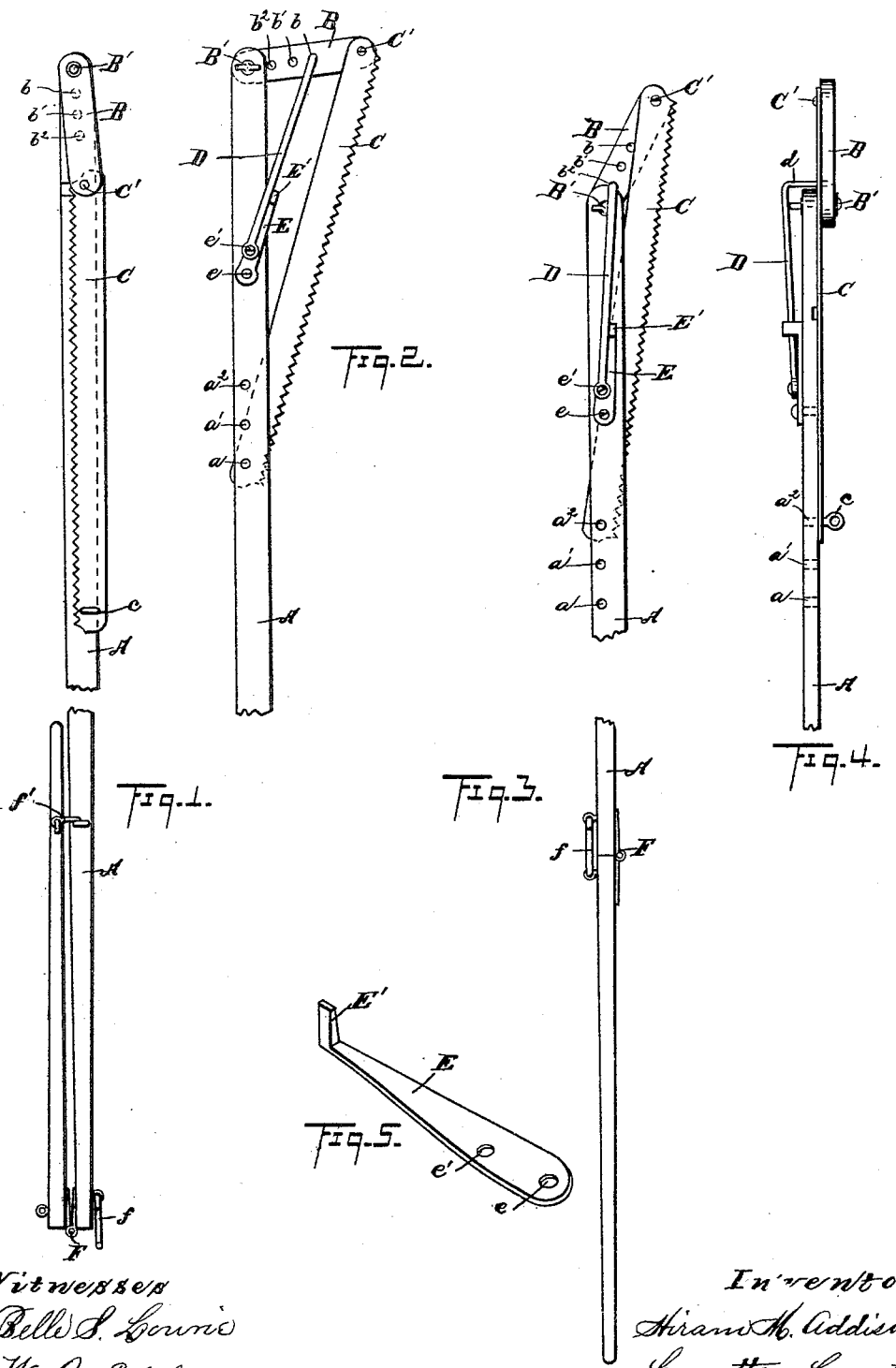

HIRAM M. ADDISON, OF CLEVELAND, OHIO.

PRUNING-SAW.

SPECIFICATION forming part of Letters Patent No. 437,764, dated October 7, 1890.

Application filed May 5, 1890. Serial No. 350,604. (No model.)

*To all whom it may concern:*

Be it known that I, HIRAM M. ADDISON, of Cleveland, in the county of Cuyahoga and State of Ohio, have invented certain new and useful Improvements in Pruning-Saws; and I do hereby declare the following to be a full, clear, and exact description of the invention, such as will enable others skilled in the art to which it pertains to make and use the same.

My invention relates to improvements in pruning-saws; and it consists in certain features of construction and in combination of parts hereinafter described, and pointed out in the claims.

In the accompanying drawings, Figure 1 is a side elevation showing the device folded. Figs. 2 and 3 are elevations showing the reverse side and showing, respectively, different working positions. Fig. 4 is an edge view. Fig. 5 is an enlarged view in perspective in detail.

A represents the handle, and B a lateral arm pivoted at B' to the handle. To the free end of this arm is pivoted at C' the one end of saw C. The other end of the saw is pivoted to handle A by means, for instance, of thumb-screw $c$, there being several holes $a$ $a'$ $a^2$, &c., in the handle for receiving this screw for attaching the saw to the handle at different points of the latter to bring the parts in position shown, respectively, in Figs. 1, 2, and 3.

D is a brace for holding arm B in the desired position and for straining the saw. Arm B has various holes $b$ $b'$ $b^2$, &c., for receiving the hook ends $d$ of the brace with arm B in the different positions shown.

For straining the saw is provided a lever E, pivoted at $e$ to handle A and pivoted at $e'$ to the one end of the brace, the lever having a thumb-piece E' for operating the lever, this thumb-piece serving, also, as a stop for engaging the brace with the lever and brace in line with each other, in which position of parts the saw is supposed to be strained sufficiently. By turning the lever in the one direction the brace is loosened so that the hook end thereof may be disengaged from the hole in arm B.

The saw having been adjusted with thumb-screw $c$ in either hole of the handle and with the brace engaging a corresponding hole in the arm, by turning the lever to the position shown in Figs. 2 and 3 the saw is strained.

In carrying the device the saw is adjusted to the position shown in Fig. 1, thumb-nut $c$ engaging a hole, in which position of parts the handle projects beyond the teeth of the saw, and the device may be carried and handled without danger of injury from the saw.

In Fig. 3 the saw is shown only slightly advanced from the handle, screw $c$ engaging hole $a^2$ and the hook end of the brace engaging hole $b^2$ of arm B, in which position of parts small limbs may be sawed off, and the device may be used between limbs that are comparatively near together.

Where there is plenty of room for operating the saw, the latter is adjusted to the position shown in Fig. 2, screw $c$ engaging hole $a$ and the brace engaging hole $b$, whereby the oblique line of the saw relative to the handle causes the saw to feed freely into the wood without pressing the saw onto the wood by hand.

An extension or folding handle is shown, having a hinged joint F, having a hook $f$ for holding the handle distended, and having a hook $f'$ for holding the handle folded. (See Figs. 1 and 3.)

What I claim is—

1. A pruning device comprising a handle, a lateral arm pivoted to the handle with a saw pivoted to the lateral arm, means for securing the saw to the handle at different points of the latter, and a brace connected with the handle and adapted to engage the lateral arm at different points thereof, according to the position of the arm and saw, substantially as set forth.

2. In combination, a handle, a lateral arm pivoted to the handle, a pruning-saw pivoted to the lateral arm, with means for attaching the saw to the handle at different points of the latter, a brace adapted to engage the lateral arm at different points thereof, according to the position of the arm and the saw, and a lever pivoted to the handle and pivoted to the brace for extending the latter in straining the saw, substantially as set forth.

In testimony whereof I sign this specification, in the presence of two witnesses, this 23d day of April, 1890.

HIRAM M. ADDISON.

Witnesses:
C. H. DORER,
WILL B. PAGE.